US007533797B2

(12) United States Patent
Stulz et al.

(10) Patent No.: US 7,533,797 B2

(45) **Date of Patent: *May 19, 2009**

(54) SHORT DEPTH CASH DRAWER WITH A MOVEABLE BASE

(75) Inventors: Mark Stulz, Victoria, MN (US); Robert P. Daugs, Shoreview, MN (US); John Meilahn, St. Michael, MN (US); Jack Brown, Blaine, MN (US)

(73) Assignee: APG Cash Drawer, Minneapolis, MN (US)

( * ) Notice: Subject to any disclaimer, the term of this patent is extended or adjusted under 35 U.S.C. 154(b) by 599 days.

This patent is subject to a terminal disclaimer.

(21) Appl. No.: 11/126,658

(22) Filed: May 10, 2005

(65) Prior Publication Data

US 2005/0263580 A1 Dec. 1, 2005

Related U.S. Application Data

(60) Provisional application No. 60/569,974, filed on May 10, 2004.

(51) Int. Cl.
*G06K 15/00* (2006.01)

(52) U.S. Cl. ........................................ 235/22; 235/7 R

(58) Field of Classification Search .................. 235/22, 235/10, 7 R, 379, 383

See application file for complete search history.

(56) References Cited

U.S. PATENT DOCUMENTS

| | | | | |
|---|---|---|---|---|
| 4,436,989 | A | 3/1984 | Schuldt | 235/22 |
| 5,371,344 | A | 12/1994 | Buie et al. | 235/1 R |
| 5,390,764 | A | 2/1995 | Kerber | 186/68 |
| D358,162 | S | 5/1995 | Buie et al. | D18/4 |
| 5,723,850 | A * | 3/1998 | Lambert | 235/22 |
| 6,390,363 | B1 | 5/2002 | Morrison et al. | 235/383 |
| 6,729,242 | B2 | 5/2004 | Kerber | 108/42 |
| 6,834,596 | B2 | 12/2004 | Kerber | 108/42 |
| 7,059,513 | B2 * | 6/2006 | Daugs et al. | 235/10 |
| 2002/0189502 | A1 | 12/2002 | Kerber | 108/42 |
| 2003/0205177 | A1 | 11/2003 | Kerber | 108/42 |

OTHER PUBLICATIONS

Cashier Console from P.O.S. Tech advertisement, Jun. 2002.

Cash Bases Inc. "The Advantage Range" advertisement, Sep. 1999.

Cash Bases Inc. "Technical Specifications", Sep. 1999.

Cash Bases, Inc. "U" Shaped Drawer for Integration With a Flatbed Scanner, at least by Sep. 1999.

* cited by examiner

*Primary Examiner*—Daniel St.Cyr

(74) *Attorney, Agent, or Firm*—Westman, Champlin & Kelly, P.A.

(57) ABSTRACT

A cash drawer housing holding a cash drawer for use in a check stand and placed over a scanner is disclosed. The cash drawer housing has a moveable base member that is located above the scanner. The moveable base member allows the scanner to be moved without moving the cash drawer housing. The base member rotates or moves in response to contact from the scanner below during removal. The moveable base member can be scanned during removal by a latch to hold the base member out of the way to permit easier scanner removal and reinstallation.

14 Claims, 14 Drawing Sheets

SHORT DEPTH CASH DRAWER WITH A MOVEABLE BASE

The present application is based on and claims the benefit of U.S. provisional patent application Ser. No. 60/569,974, filed May 10, 2004, the content of which is hereby incorporated by reference in its entirety.

BACKGROUND OF THE INVENTION

Anyone who has been in a retail store is familiar with the checkout stand; the checkout stand is where one pays for the selected items. Checkout stands, also commonly referred to as check stands, can be arranged in a broad variety of configurations. The checkout stand may include one belt, two belts, three belts, or merely have a stationary surface, generally supported by a counter or cabinet. A bar code scanner is typically recessed into the counter or cabinet. Also included at the checkout stand are the register, cash drawer, a keyboard, a credit card machine (often referred to as a credit card swipe and pin pad machine), a receipt printer, monitor or display, telephone, and other such accessory equipment. The register, cash drawer, and other equipment is typically positioned on a cabinet often referred to as a cash-stand, which is positioned to the left or right of the cashier, at a right angle to the check lane, as the cashier is looking at the customer.

The goal within the industry has been to arrange the checkout stand in a manner that is convenient for both the customer and the cashier. The layout of the checkout stand and the configuration of the equipment impact both the customer and cashier. Because the checkout stand is a highly visible feature of the retail shopping experience for the customer, providing a well arranged and configured checkout stand is important. The layout of the checkout stand can enhance or deter from the customer's experience, which can affect whether or not that customer shops at that store again. For example, a cluttered checkout stand, with cables and electrical cords exposed, is messy and uninviting. A checkout stand not well organized is also viewed as messy and as inefficient.

For the cashier, standing at the checkout stand is a daily occurrence, with repetitive motions. When the cash drawer and register are located at a cash-stand, the cashier has to twist or rotate 90 degrees from the scanner to the register and back to the customer, losing both eye contact with the customer as well as their view of the cash drawer, which may be inadvertently left open as they again turn to face the customer.

With more and more equipment being added to checkout stands, the space available for positioning the equipment is at a premium. One solution has been to include a podium, console, or other auxiliary structure positioned away from the cash-stand, typically positioned between the cashier and the customer in the vicinity of the bar code scanner. In some designs, these consoles are built onto a counter surface; in other designs, the consoles are bolted or otherwise attached to the counter. This console generally supports some of the equipment integral to the checkout process, for example, such as the keyboard, a credit card swipe and pin pad machine, and/or a display monitor. A separately mounted horizontal pad, often called a checkwrite, can be used by the customer for writing checks or for signing credit card receipts. The cash drawer and receipt printer have, to date, remained to the left or right of the cashier at the cash-stand.

The arrangement of having the console above the scanning area and above the scanner is generally a superior arrangement. To maximize the ease of the checkout transaction, it is desired to keep the height of the console as low as possible, preferably with near zero clearance between the tip of the scanner and the bottom of the console. However, lowering the height of the console to improve customer-cashier view can hinder the minimum clearance needed above the scanner, for example, for removal of the scanner for maintenance and service.

What is desired is a compact console arrangement that allows access to available equipment, such as the scanner, and provides a configuration that is friendly and convenient to both the customer and cashier. What is also desired is a console arrangement that minimizes cashier fatigue and injury potential due to twisting stresses, that provides cash drawer security, and that speeds the checkout transaction.

SUMMARY OF THE INVENTION

The program invention is directed towards the cash drawer assembly and in particular the cash drawer housing that has a movable base member. The movable base member is provided to allow easier removal of a scanner or other item located below the cash drawer assembly. The removal process begins when the user opens the cash drawer and removes the sliding inner drawer from the cash drawer housing. Following removal of the cash drawer locking tabs which hold the base member in its normal position are released allowing the base member to move freely up into the vacant space of the cash drawer housing. While removing the scanner from the check stand it is tilted or rotated or otherwise moved until it comes in contact with the movable base member. Movable base member rotates in response to this contact providing additional clearance that allows the scanner to enter the space that is normally defined by the cash drawer housing. This process is reversed when the scanner is reinstalled into the check stand. An alternative embodiments the movable base member can be latched to the top plate of the cash drawer housing in order to make the removal of the scanner easier.

The present invention is also directed to a short depth cash drawer including an inner drawer and an opening device. The inner drawer includes an open top side, a till holding portion, a front portion, a rear portion, and an opening device interface region. The opening device interface region is located in the center of the cash drawer. The opening device opens the cash drawer when an input is received. Further, the rear portion of the opening device does not extend beyond the rear portion of the cash drawer when the inner drawer is closed.

DETAILED DESCRIPTION OF THE PREFERRED EMBODIMENTS

Figure 1A:
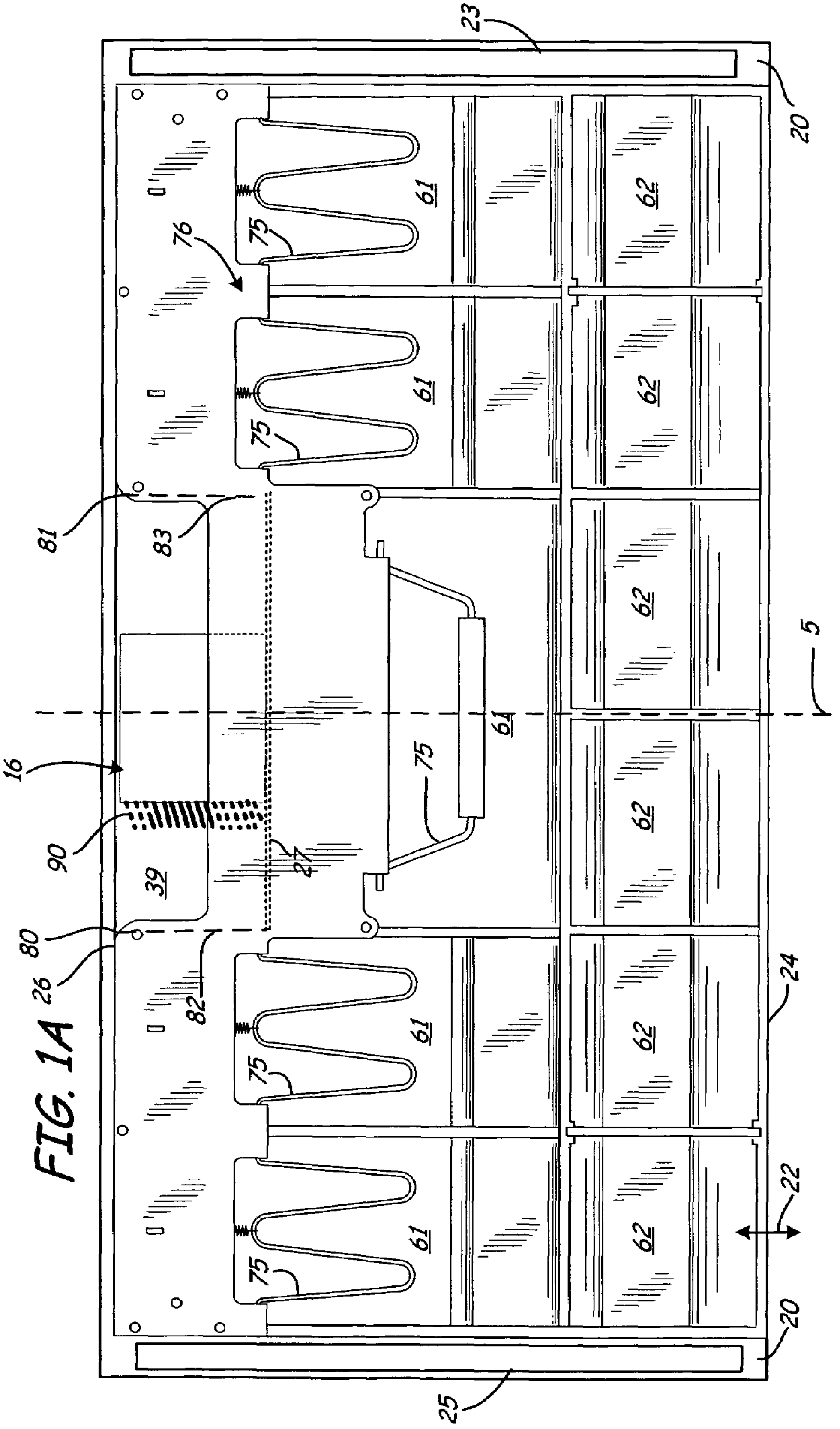
FIG. 1A is a top plan view of a cash drawer assembly.

FIG. 1A is a top plan view of a cash drawer assembly 10 according to one embodiment of the present invention with a top portion 78 (shown in FIG. 1B) of housing 12 removed for clarity. Cash drawer assembly 10 includes a housing 12, an inner drawer 14, a latch mechanism 16 and a key locking mechanism 18. Drawer 14 is slidably mounted within housing 12 by a pair of slides 20 mounted on opposite sides of housing 12. Drawer 14 is slidable within housing 12 and slides on slides 20 in the direction indicated by arrow 22. While a pair of slides 20 are illustrated in FIG. 1A, those skilled in the art will realize that other support arrangements and/or number of slides 20 can also be used. The slides 20 can be installed in the housing 12 such that the drawer can open at a downward angle. This downward angle of the drawer increases the ergonomic efficiency of the drawer by allowing a cashier easier access to the contents. In various embodiments of the present invention the downward angle can range between 0 and 15 degrees, preferably this angle is approximately 5 degrees. However, the cash drawer assembly 10 can be installed at a downward angle to achieve the same effect.

Commonly, a cash tray or till 60 is inserted into drawer 14. The cash tray 60 typically has a number of dividers 61 and 62 for storing currency, coupons and other items required in a cash register system. Depending on the country or the specific culture where the cash tray 60 is used, paper currency is stored in different positions or arrangements. Commonly, paper currency is stored in dividers 61 in a flat position as illustrated in FIG. 1A, and is sorted by value. Metal or coin currency is commonly stored in dividers 62 and is also sorted by value. However, in Europe it is common to store paper currency in dividers 61 in an end on configuration (not illustrated).

Figure 1B:
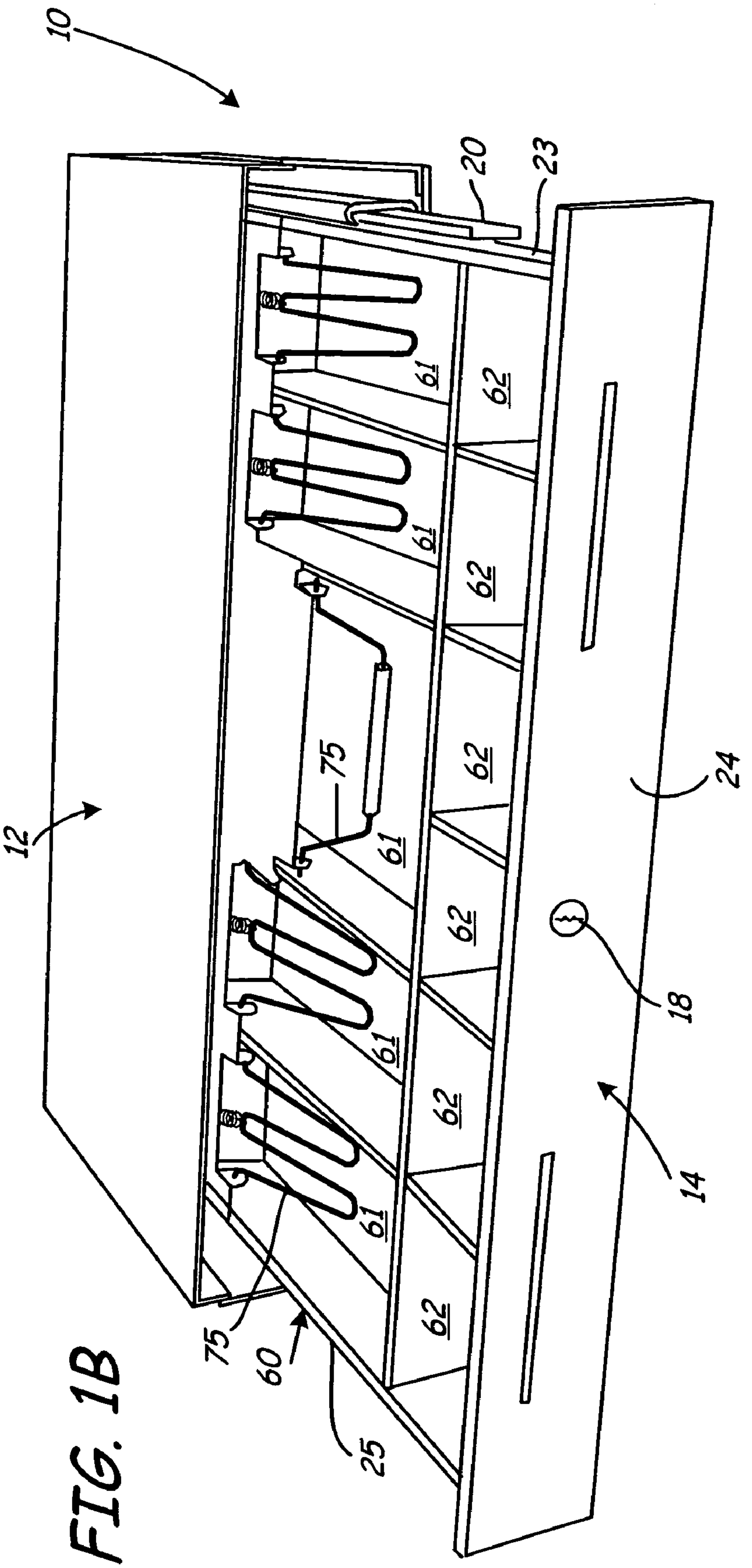
FIG. 1B is a perspective view of an open cash drawer in cash drawer assembly.

When cash tray 60 is configured to store paper currency in a flat position, the cash tray is commonly equipped with currency holder arms 75. Currency holder arms 75 are in one embodiment a flip-up arm that rotates about a pivot 76. When inner drawer 14 is opened, a cashier can access the currency in the cash tray 60 by lifting up currency holder arms 75, as illustrated in FIG. 1B. When the inner drawer 14 is closed, currency holder arms 75 are pushed down as they come into contact with a top portion 78 of housing 12. This causes the currency holder arm 75 to pivot about pivot 76 and press down on the currency contained in the respective currency divider 61, thus holding the paper currency in place.

Inner drawer 14 has a front face or panel 24, a rear panel 26, and an intermediate panel 27 recessed from rear panel 26. A locking plate 28 is attached to panel 27. Locking plate 28 extends downwardly towards the bottom of panel 27, and has a locking tab portion 30 which is substantially collinear with, and coplanar with, the remainder of plate 28.

One embodiment of a latch ejection mechanism 16 (LEM) includes a pivotable rotary latch member 32 (rotary latch 32), and an electrically operated solenoid 34. However, other types of latch mechanisms can be used such as two stage latch can be used. When in the locked position, the LEM 16 holds drawer 14 in the closed position illustrated in FIG. 1. LEM 16 thus inhibits the movement of drawer 14 forwardly out of housing 12 into an open position illustrated in FIG. 1B. To open drawer 14, the LEM 16 receives an input signal from an external control component (not illustrated). This input signal causes actuation of the LEM 16. Upon actuation of the LEM 16, a restraining component disengages and allows drawer 14 to slide within housing 12.

Cash drawer assembly 10 is conventionally provided with a spring 90, which is coupled to base plate 39 of housing 12 and which biases drawer 14 to an open position. However, any other spring configuration can be used as well. Further, other opening and biasing elements can be used for opening and holding closed the drawer 14.

In contrast to the configuration of other cash drawers, latch mechanism 16 and spring 90 are recessed within the periphery of the inner drawer 14. In the embodiment illustrated in FIGS. 1A and 1B, latch mechanism is positioned about centerline.5 relative to the direction of travel of the drawer 14. However, other locations within the periphery of the inner drawer 14 can be used. Such as the locations discussed in U.S. patent application Ser. No. 10/342,106.

Rear portion 26 of inner drawer 14 is notched or recessed at points 80 and 81 creating a recessed area in inner drawer 14 where latch mechanism 16 and spring 90 are illustratively inserted. Extending from point 80 towards the front 24 of inner drawer 14 is a side plate 82. Side plate 82 defines an inner edge surface of the recessed area between point 80 and second rear panel 27. A similar side plate 83 extends from point 81 to secondary panel 27. The depth of the recess is determined by the depth of latch mechanism 16 and spring 90. The larger, hence deeper, the spring 90 and latch mechanism 16 are, the greater the depth of the recessed area. Of particular note, in the embodiment illustrated in FIG. 1A, the rear portion 17 of latch mechanism 16 does not extend beyond the rear portion 26 of inner drawer 14 when inner drawer 14 is in the closed position. This arrangement of latch mechanism 16 relative to the housing 12 allows the housing 12 to exhibit a significantly shorter depth than is present in traditional prior art cash drawers.

In one embodiment, inner drawer 14 has a depth of approximately 11 inches in contrast to the prior art's depth of 14½ inches. This decreased depth of the inner drawer 14 and the associated housing 12 allows an operator of multiple cash drawers 14 to increase the available salable floor space in the store when inner drawer 14 is used in a checkout lane without reducing the number of checkout lanes available. As the inner drawer 14 in the present embodiment has a depth that is approximately 3 inches shorter than the prior art cash drawer, an operator using four of these cash drawers would experience an increase in salable floor space equivalent to one foot, without having to reduce the number of checkout lanes or change other configurations of the retail establishment. Further, by placing the LEM within the foot print of the inner drawer 14 it is possible to reduce the overall width of the cash drawer. By reducing the width of the cash drawer additional space is freed to display high profit items on the check stand.

Figure 2A:
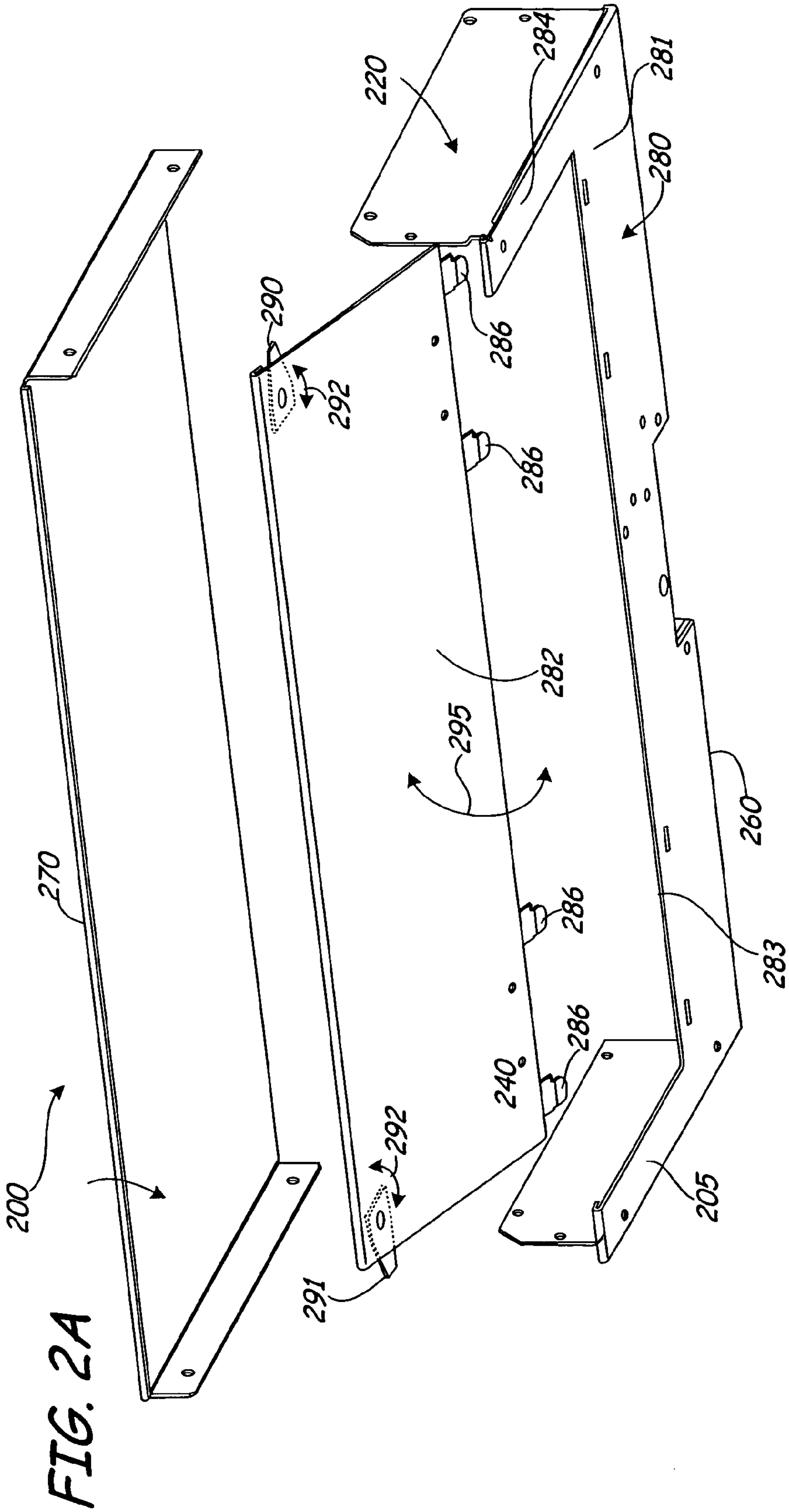
FIG. 2A is an exploded view of a housing configured to hold the cash drawer.
Figure 2B:
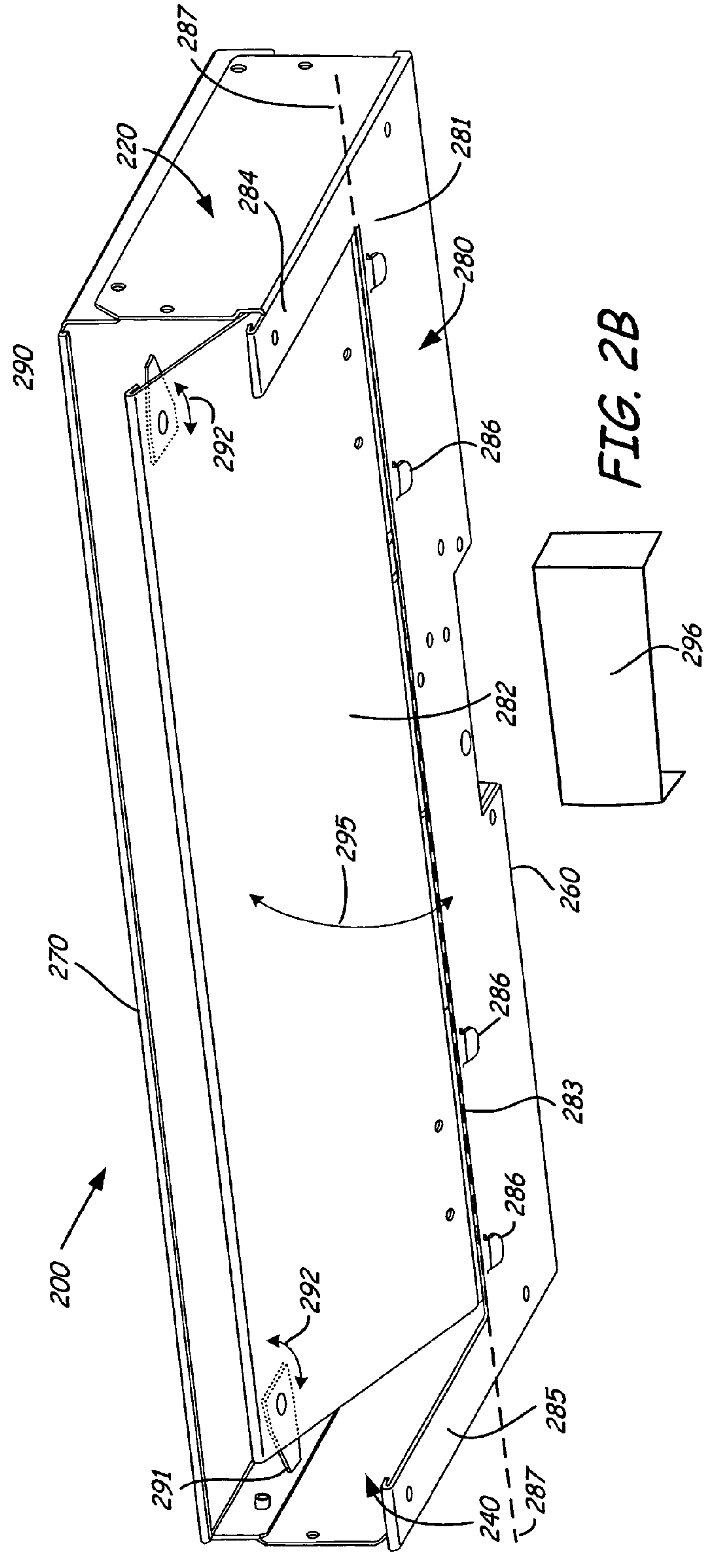
FIG. 2B is an assembled view of the housing of FIG. 2A.

FIG. 2A and FIG. 2B are views of a cash drawer housing 200 according to one embodiment of the present invention. FIG. 2A illustrates the cash drawer housing 200 in an exploded view. FIG. 2B illustrates the cash drawer housing 200 in an assembled view. Housing 200 is configured to accept a cash drawer such as the inner drawer 14 described in FIGS. 1A and 1B. However, other cash drawers can be used in the housing 200. Housing 200 includes a first side plate 220, a second side plate 240, an optional back plate 260, a top plate 270, and a bottom plate 285. However, top plate 270 can be a fully enclosed case. Housing 200 is configured to be attached to a podium or to a check stand. The depth of the first and second side plates 220 and 240 is marginally deeper then the depth of the inner drawer 14 to allow for minor movement of the drawer and the placement of any cables.

First side plate and second side plate are formed such that the slides 20 can be attached to the inside to permit the cash drawer to open and close in response to an actuation from the cashier to the latch ejection module (LEM) 16. First and second side plates have, in one embodiment, flanges are provided on either a top portion of the side plates 220, 240 or the top plate 270 to assist in the attachment of the top plate 270 to the side plates. Side plates 220 and 240 attach to an optional back plate which forms a back portion of the housing. In one embodiment flanges are provided on the side plates of the back plate to provide an attachment point to the side plates. However, in an alternative embodiment these flanges can be located on the side plates.

When the optional back plate 260 is present it protects the contents of the cash drawer. However, in other embodiments the back plate 260 is replaced by a return flange that is attached to a portion of back plate 280 that would engage with a full case top plate 270. Also, included in the area around back plate 260 is a cable channel 296. Cable channel 296 provides an access area for cables to pass through the cash drawer assembly 10. Cable channel 296 is provided in the notched area of base plate 280 such that the footprint of the cash drawer assembly is not increase.

The top plate 270 is attached to the first side plate 220, second side plate 240, and the back plate 260, and covers the top of the inner drawer 14 from access. Base plate 280 is in one embodiment attached to the bottom of the side plates 220 and 240. However, in the embodiment illustrated side plates 220 and 240 form a portion of the base plate 280. The base plate 280 also provides a mounting area for the LEM 16. The base plate 280 is attached to the side plates and back plate through flanges. However, other attachment methods can be used. Depending on the design of the housing, these flanges can be located on the base plate, on the respective side plates, or any combination of thereof. While attachment of the various plates has been discussed using flanges other attachment methods can be used.

In the present invention the base plate 280 is divided into two sections: a first stationary section 281 and a second moveable section 282. The moveable section is provided to allow for the removal of a scanner or other device from a check stand without removing or disassembling the podium, as is currently required in prior art check stands. A more detailed description of the removal of a scanner with the moveable section of the base plate will be described later with reference to FIGS. 4A-4G.

The first portion is shaped such that it connects the base plate to the side plates. The first section also includes arms 284,285 that extend from an interface area 283 towards the front of the housing. The second section connects to the first portion at interface area 283. The location of the interface area 283 is determined by a number of factors. In one embodiment the interface area 283 is determined by the location of the LEM 16 relative to the back plate 260. In another embodiment, the location of the interface area is determined by the length (or depth) of the scanner. In yet another embodiment, the interface area is located such that the second section cannot be removed when tilted without removing the top plate from the housing. These criteria are not meant to be exclusive of other factors that could influence the location of the interface area, such as height above the scanner, or safety and ergonomic considerations.

In the embodiment illustrated in FIG. 2A and FIG. 2B the two portions are connected by interlocking tabs 286. However, other methods of connecting the two portions can be used that allow the second section to move relative to the first portion when the second section is contacted by the scanner or other device located under the housing. Other attachment methods can include, for example, hinges that are formed on the first section and the second section that allow the second section to rotate about axis 287 while preventing the separation of the first section from the second section.

As the second section 282 is configured to rotate relative to axis 287 when the scanner is to be removed, it is important that second section remain in plane with the first portion during normal operation of the cash drawer system. To help ensure that this arrangement is maintained during normal operation locking tabs 290, 291 are provided on the second section 282 to lock the second section into alignment with the first portion. In the embodiment illustrated in FIG. 2 the locking tabs 290, 191 are rotatable tabs that interface with the first section 281 at an interface area on the arms 289, 285. However, other methods can be used to hold the second section 282 in position when the cash drawer is in use, such as a hook and eye, or moveable slides. As a security feature, the locking tabs should be accessible from inside the housing when the inner drawer is removed. This is to prevent unscrupulous persons from accessing the contents of the inner drawer by lowering the second section 282 when the inner drawer is closed.

To release the second section 282 the tabs 284, 285 are rotated in the direction of arrow 292 or 293. This rotation removes the tabs from the interface area and allows the second section to rotate about axis 287 upwards. In some embodiments, tabs or other restraints are provided to prevent the second section from rotating towards the scanner when the locking tabs are released.

When the scanner is removed the second section moves towards the top plate when it is contacted by the scanner. This movement is illustrated by arrow 295. However, in alternative embodiments the second section can be locked into a removal position by a locking mechanism, such as a hook and eye. When locked in the removal position the scanner may be removed without the need to move or contact the second section 282 further.

Figure 3:
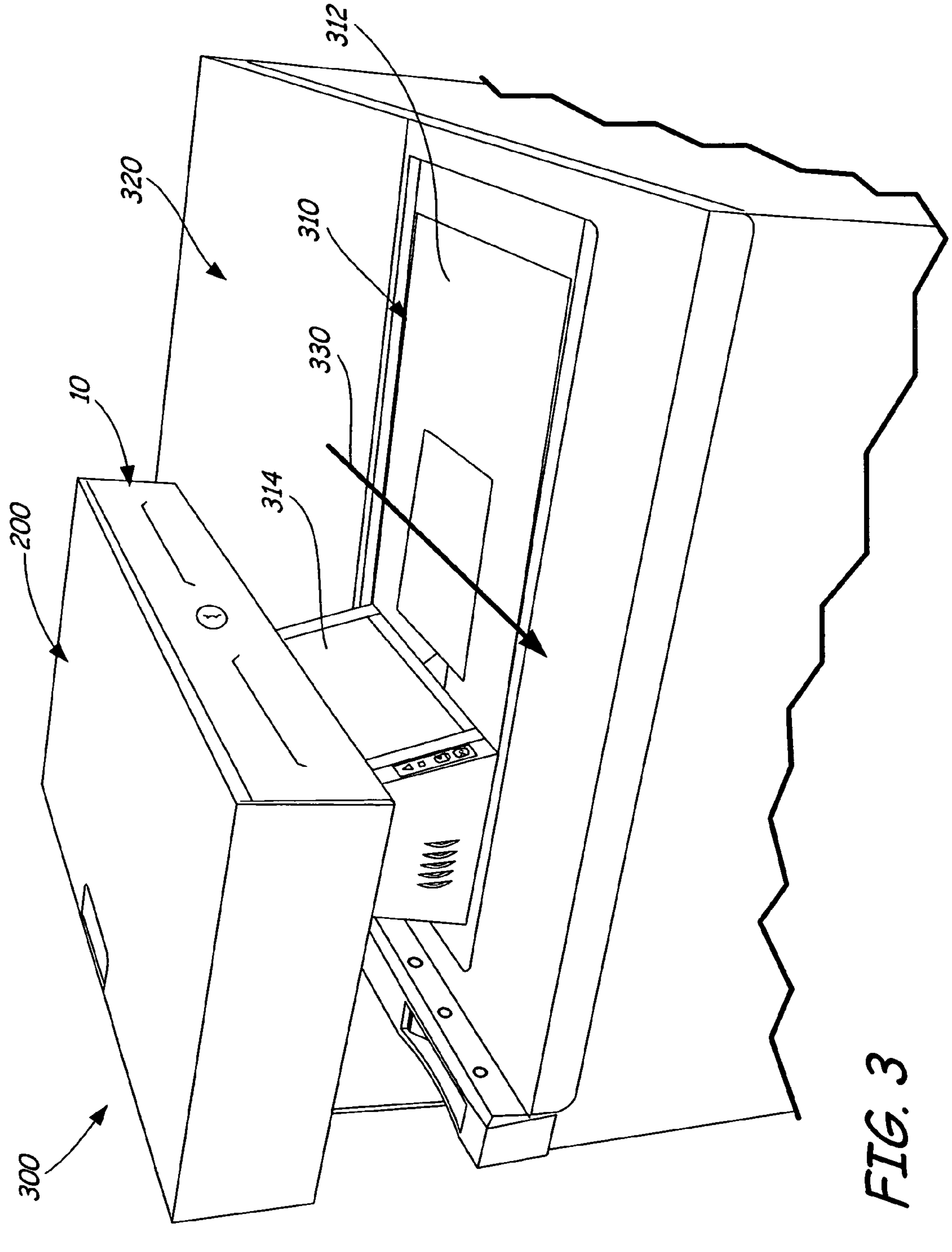
FIG. 3 is a perspective view of the podium of FIG. 2 with the cash drawer assembly of FIG. 1 placed over a scanner.

FIG. 3 illustrates an assembled cash-stand 300 according to one embodiment of the present invention. FIG. 3 also shows cash drawer assembly 10, such as the cash drawer assembly described in FIG. 1A, 1B and FIG. 2, installed into podium or a cash-stand 300. Cash drawer assembly 10 is placed into cash drawer housing 200 which is attached to podium 300. Podium 300 also includes a scanner 310. Scanner 310 includes a scanner bed 312 and a scanner head 314. Scanner 310 is located such that a top portion of the scanner head 314 is in close proximity to the base plate 280 of the cash drawer housing 200. This arrangement allows for the optimal positioning of the cash drawer relative to a cashier using the podium 300.

When in use the cashier takes products from the product placement surface 320 and scans them with scanner 310. The product is then moved in the direction of product path arrow 330. Though product path arrow 330 is shown right to left, those skilled in the art will readily recognize that the process can easily be reversed depending on the set-up. Further, when the cashier opens the cash drawer to access the contents, the height of the drawer is closer to the ergonomically preferred height. This closeness of the cash drawer assembly to the scanner presents problems when the scanner is removed. In one embodiment the top of the scanner is within one half of one inch of the base plate of the cash drawer housing. However, other distances can be used.

Figure 4A:
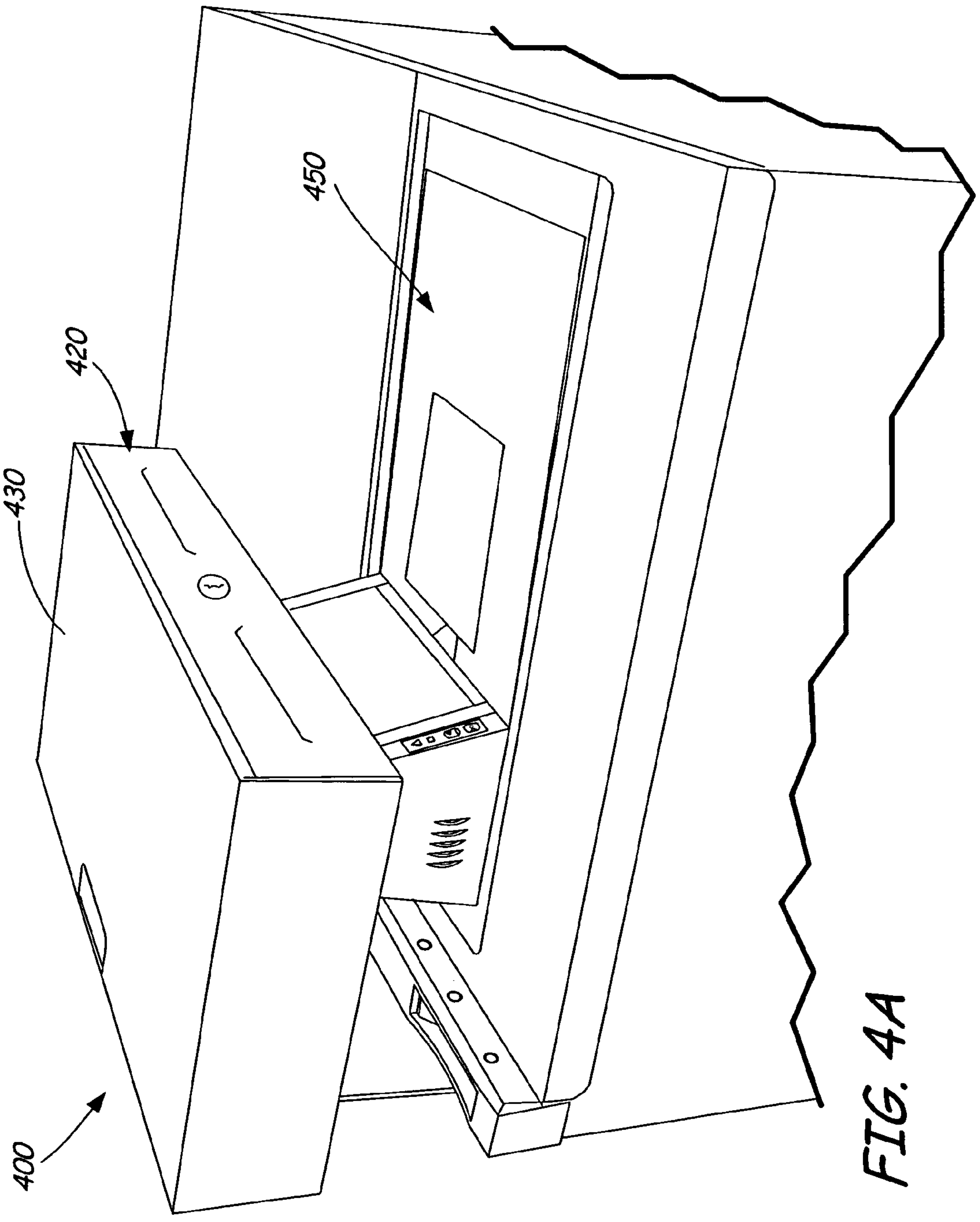
FIGS. 4A-4G illustrate the removal of a scanner from beneath the cash drawer housing according to one embodiment of the present invention.

FIGS. 4A-4G graphically illustrate the removal of a scanner 450 from a check stand 400 having a cash drawer 420 and a cash drawer housing 430 incorporating the features of the present invention. FIG. 5 is a flow diagram illustrating the associated steps when removing the scanner 450. In FIG. 4A the cash drawer 420 and the scanner 450 in a normal operating configuration with the scanner 450 in place in the cash-stand and the cash drawer closed. FIG. 4A is similar to FIG. 3.

Figure 4B:
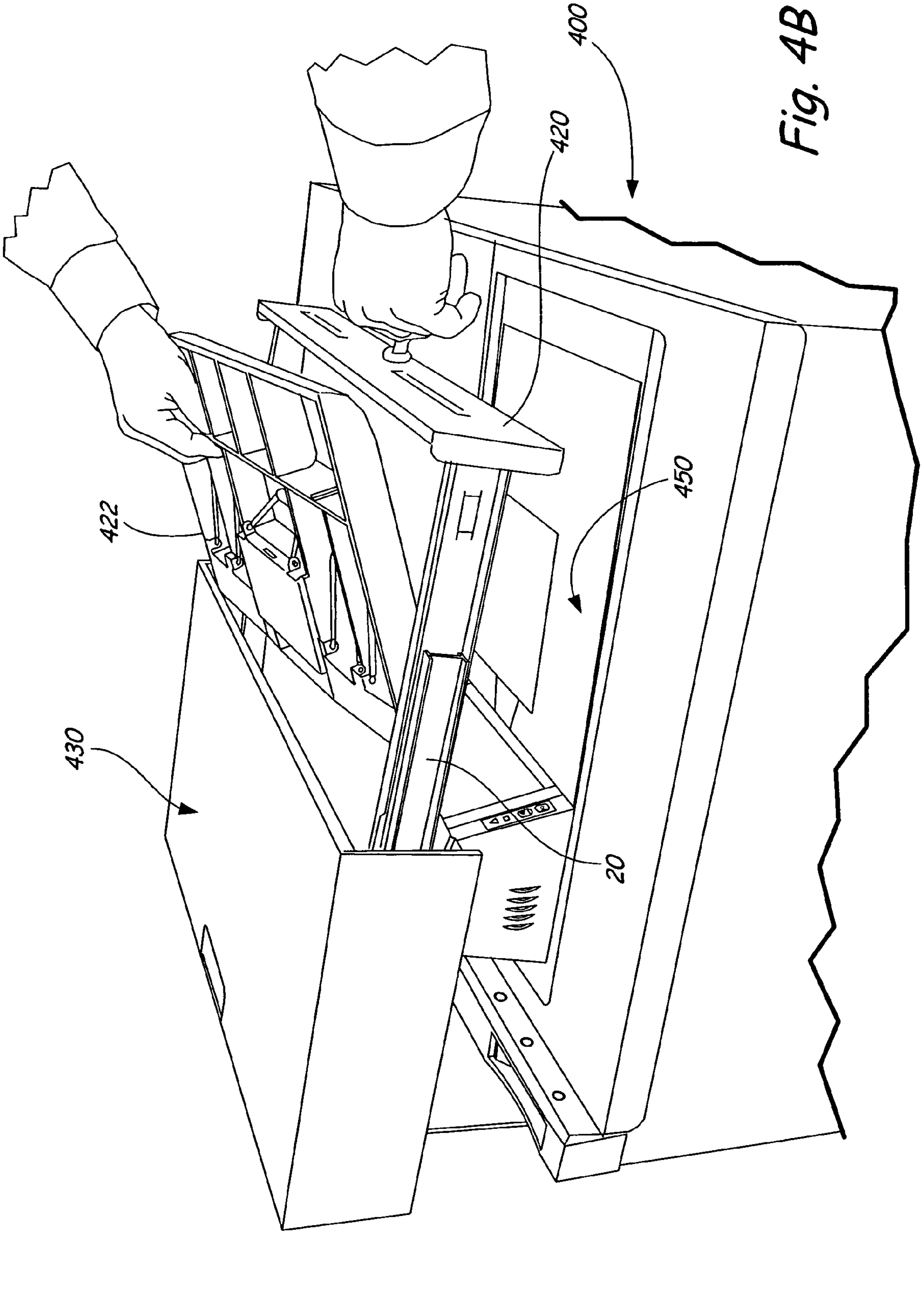
Figure 4C:
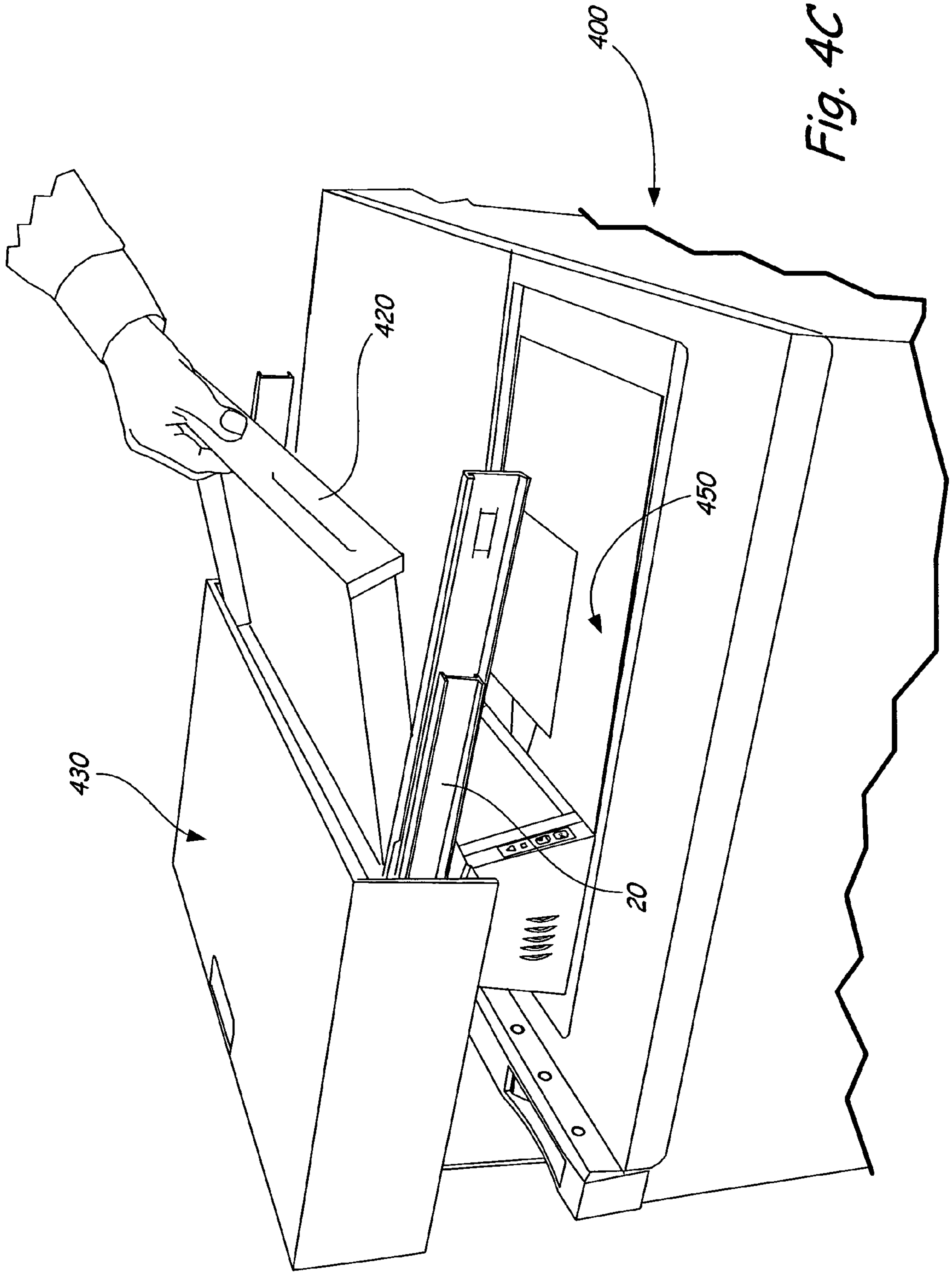
Figure 4D:
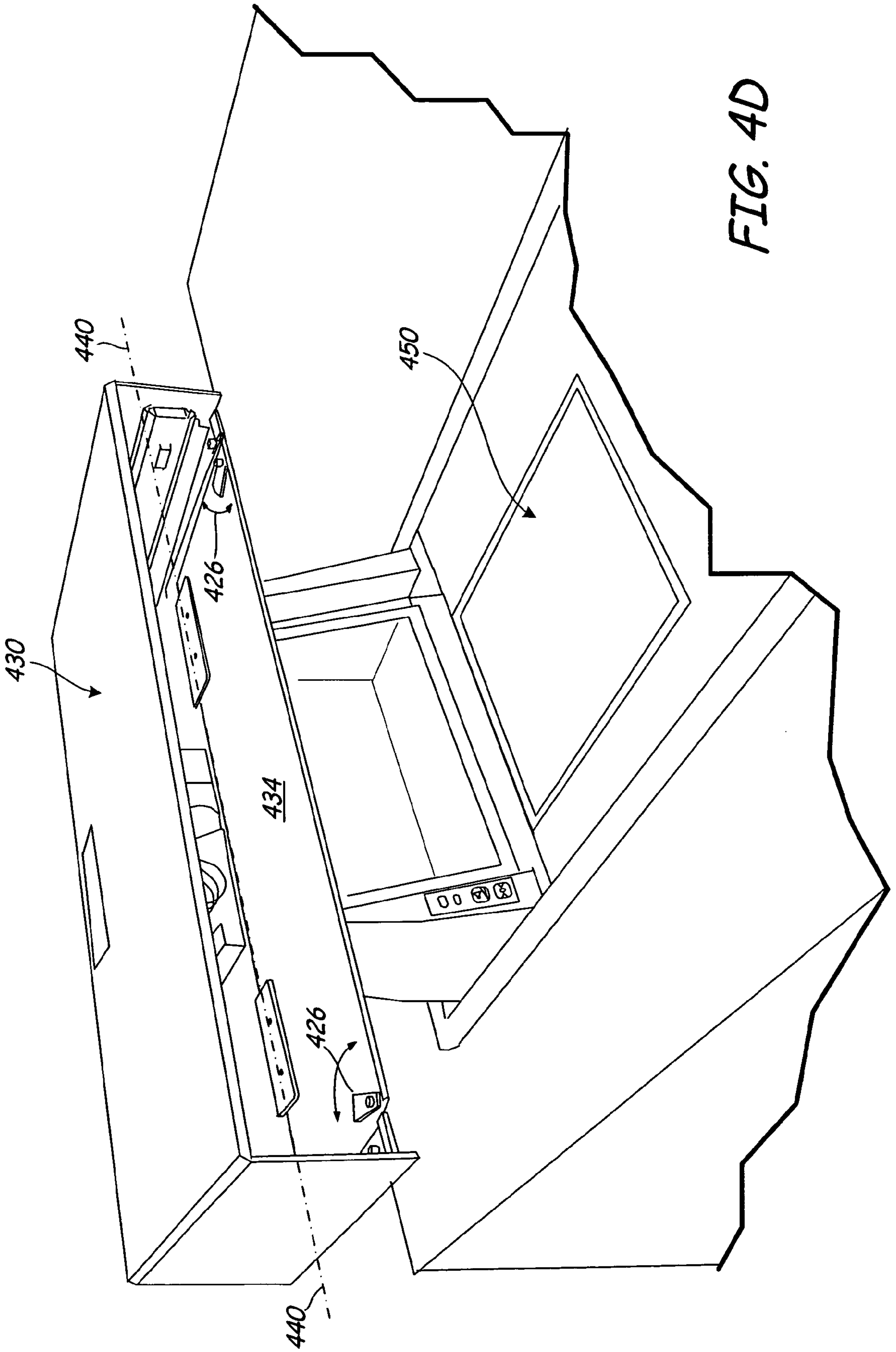
Figure 5:
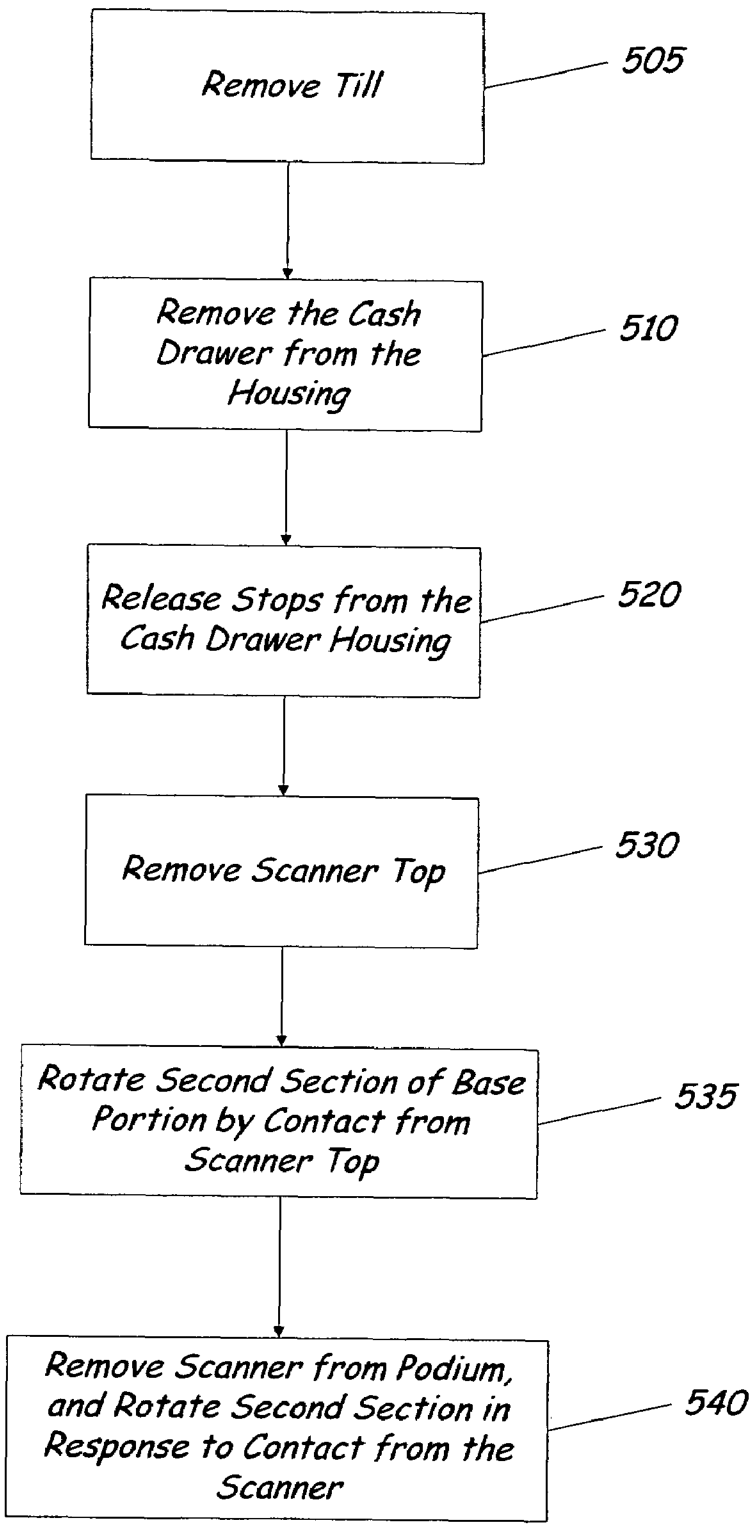
FIG. 5 is a flow diagram illustrating the steps performed when removing the scanner according to one embodiment of the present invention.

In FIG. 4B the till 422 is illustratively removed from the inner drawer 420. This step is illustrated at block 505 of FIG. 5. In FIG. 4C the inner drawer 420 is removed from the housing 430 using a method appropriate for the type of sliding system employed in the cash drawer design. In the embodiment illustrated in FIG. 4C, the slides 20 are released by lifting the inner drawer 420 upwards at an angle, and releasing a catch (or gather connection devices) on the slides 20 that constraints the cash drawer movement within the slides 20. The removal of the cash drawer is illustrated at step 510.

Once the cash drawer 420 is removed the stops 426 are turned to allow the second section 434 of the base plate 431 to rotate about axis 440. This is illustrated in FIG. 4C. The releasing of the stops is illustrated at step 520.

Figure 4E:
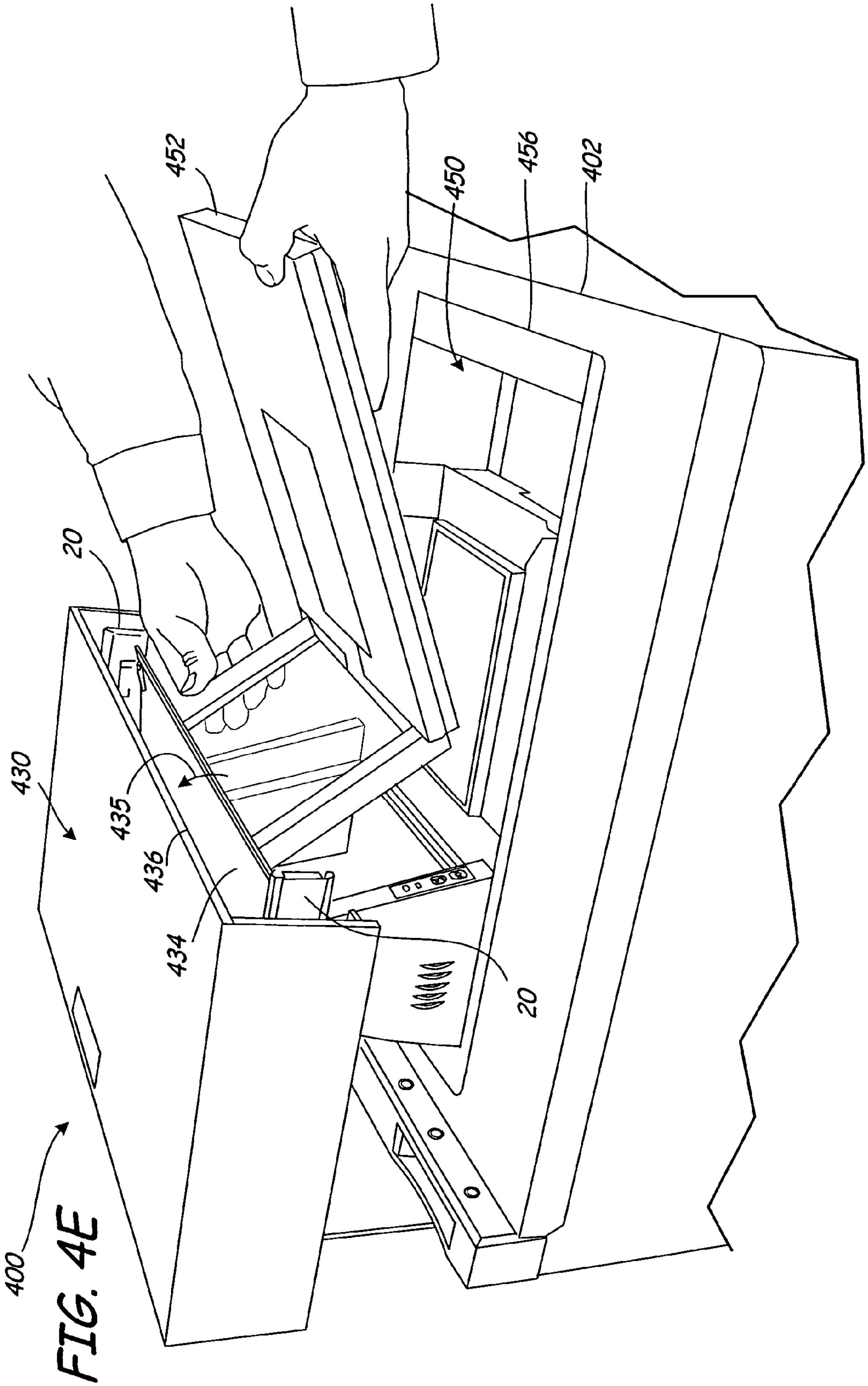

Once the second section 434 has been released, and is free to rotate about axis 440 the components of scanner 450 can be removed. In FIG. 4E, the scanner top 452 is removed. Scanner top 452 is in some embodiments a scale for weighing merchandise such as fruit, and can include a glass plate to allow the scanner components to read/scan bar codes or other information contained on a product. The removal of the scanner top is illustrated at step 530.

During removal of the scanner top 452, the scanner top 452 contacts the second section 434, and causes the second section 434 to rotate upwards until it contacts the top plate 436 of housing 432. This is illustrated at step 535. However, depending on the size of the scanner top, the second section 434 does not have to contact the top plate 436 to permit removal of the scanner top 452.

In the embodiment illustrated in FIG. 4E, the second section 434 is moved in response to contact caused by the scanner top 452. However, in alternative embodiments, the second section 434 can be held in an upward position by a latch or other holding mechanism. Further, in some embodiments the steps illustrated in FIGS. 4E and 530 and 535 of FIG. 5 need not be performed, as the scanner top 452 is integral to the scanner 450 and not separable from it.

Figure 4F:
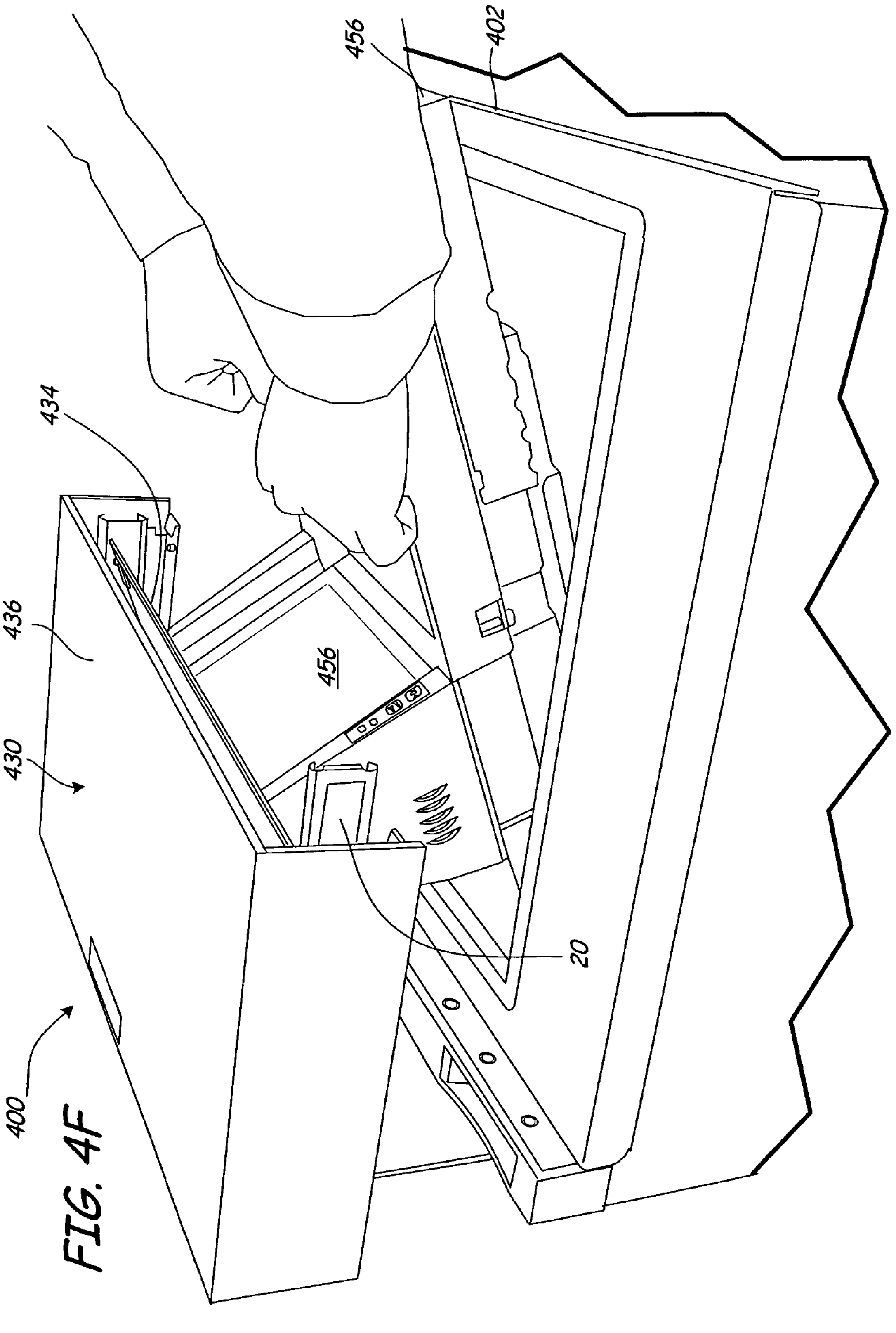

Once the scanner top has been removed from the scanner, the scanner itself can be removed from the brackets that hold it to the check stand. FIG. 4F shows the removal of the scanner 450 from the check stand according to one embodiment of the present invention. The process of removing the scanner 450 occurs using a similar process that is discussed above in FIG. 4E for removing the scanner top 452. The removal of the scanner is illustrated at step 540 of FIG. 5.

Figure 4G:
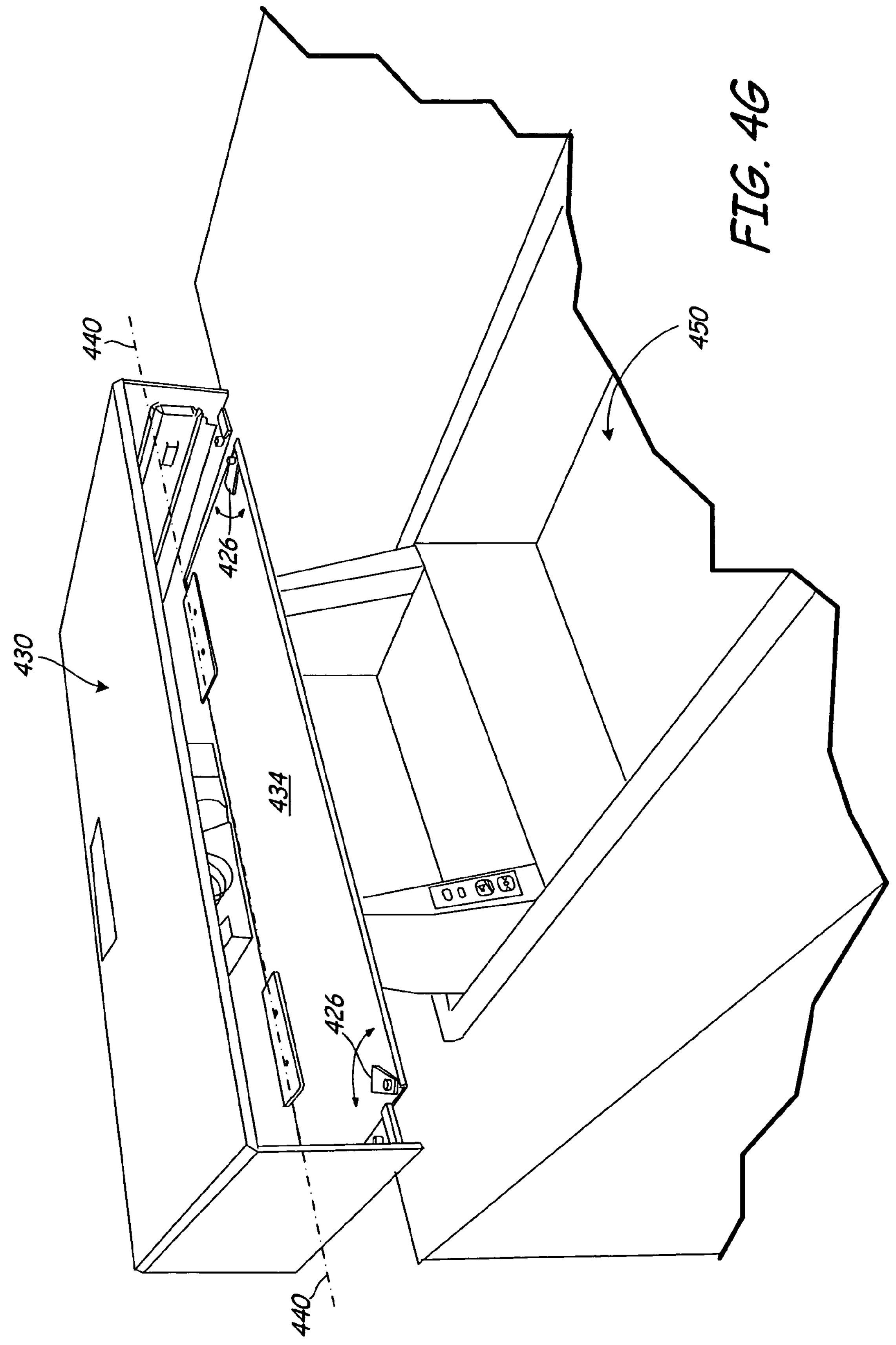

As illustrated in FIG. 4F, the scanner is lifted out of the check-stand 400 and rotated until the base portion 456 of the scanner 450 clears the forward edge 402 of the check stand 400. At this point a back portion 458 of the scanner 450 is contacting the second section 434 of the base plate. This causes the second section 434 to rotate about axis 440 and contact the top plate 436 of the cash drawer housing 430. However, other methods of moving the base plate 431 and in particular the second section 434 of the base plate, out of the way of the scanner 450 such that it can be removed can be used. For example, a latch mechanism discussed in FIG. 4E, or a hook and eye can be used. Thus, with the base plate out of the way the scanner can be removed without having to disassemble the check stand. The check stand 400 following removal of the scanner 450 is illustrated in FIG. 4G It should be noted that while the base plate 431 is illustrated in the released position, in alternative embodiments the second section 434 can remain latched in the removal position discussed above.

When reinserting the scanner and scanner top in the check stand 400, the process illustrated above is reversed. At the points in the process whereby the second section 434 is to be moved it can be moved by the user using their hand or other instrument to allow reinstallation. However, if there is a latch holding the second section in place the reinstallation is easily done and the plate is returned to its released position once the components are reinstalled.

This process allows for the removal of the components below the cash drawer assembly in the podium without the need to disassemble the check stand, or move the cash drawer assembly from its normal position.

Figure 6:
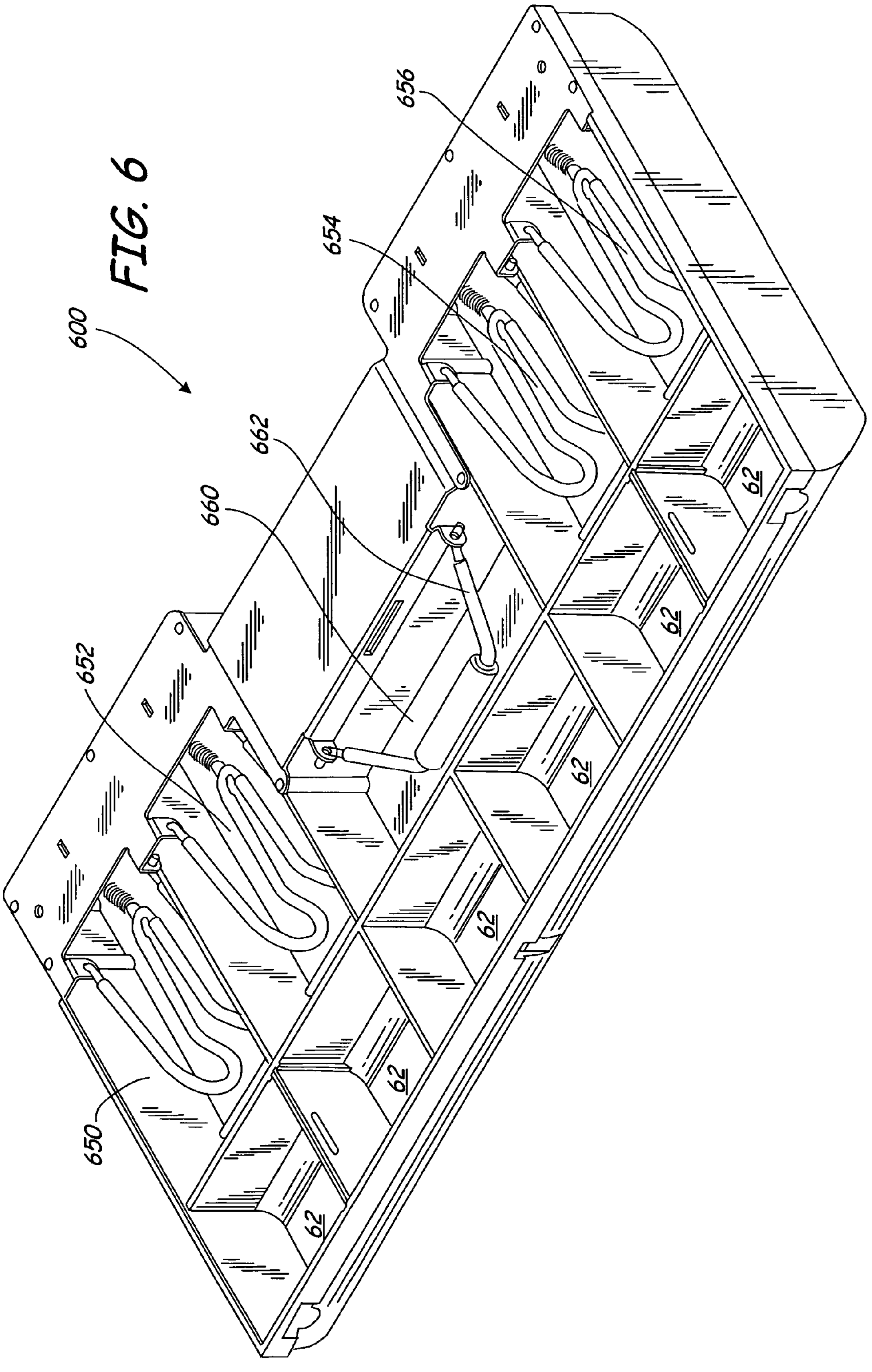
FIG. 6 is a perspective view of a till that is useable in one embodiment of the present invention.

FIG. 6 is an isometric view of a till that can be used in the cash drawer of the present invention. Traditional cash drawers provide an area for the storage of both paper currency and coin currency. Depending on where the cash drawer is used the till traditionally has a specific arrangement. For example, in the United States and Canada, typically coin currency is stored in the front portion of the till and paper currency is stored in a flat configuration towards the back of the till. However, in Europe paper currency is typically stored on it side. As the LEM in the present invention has been moved forward relative to the back of the cash drawer and the till, it is necessary to change the arrangement of the paper currency in the till.

In the embodiment illustrated in FIG. 6, the paper currency is stored in the traditional flat method used in North America. Paper currency holding areas 650-658 store currency similar to the ordinary method used in prior art tills. However, contrary to prior art tills, the center currency holding area 660 is rotated 90 degrees from the orientation of the other currency holding areas 650-650. This allows the paper currency to be stored in a face up direction and allows the LEM 16 to be located inside the dimensions of the cash drawer. In this arrangement the currency holding arm 662 or area 660 is redesigned to account for the shortened holding area relative to the axis of movement of the cash drawer. In the embodiment illustrated in FIG. 6 the currency holding arm 662 is a single arm that rotates about axis 664 when moved either by a cashier, or by contacting the top plate of the cash drawer housing. However, other arrangements of the paper currency holding areas can be used to achieve the objects of the present invention.

Although the present invention has been described with reference to preferred embodiments, those skilled in the art will recognize that changes may be made in form and detail without departing from the spirit and scope of the invention.

What is claimed is:

1. A housing for a cash drawer comprising:

a first side plate;

a second side plate;

a top plate;

a base plate having a first section and a second section;

wherein the first side, the second side, the top plate, and the base plate form the housing for the cash drawer; and wherein the base plate second section is connected to the base plate first section such that the second section is moveable towards the top plate.

2. The housing of claim 1 wherein the second section is moveable relative to the first section in response to contact from an item below the housing.

3. The housing of claim 1 further comprising:

an interface region located at a contact area between the first and second sections.

4. The housing of claim 3 wherein the first and second section are connected by tabs at the interface region.

5. The housing of claim 3 wherein the first and second section are connected by hinges at the interface region.

6. The housing of claim 1 wherein the second section further comprises:

at least one restraining component configured to retard movement of the second section relative to the first section when the at least one restraining component is in an engaged position, and continued to allow movement when in a disengaged position.

7. The housing of claim 6 wherein the restraining component is a pair of rotating tabs.

8. The housing of claim 7 wherein the pair of rotating tabs interface with the first section.

9. The housing of claim 6 wherein the restraining component is a hook and eye.

10. The housing of claim 6 wherein the restraining component is a pair of locking slides.

11. A cash stand comprising:

a cash drawer housing, having a moveable base portion;

a removable device located below the cash drawer housing; and wherein the base portion of the cash drawer housing is located such that when the removable device is removed the base portion moves in response to contact from the removable device.

12. The cash stand of claim 11 wherein a top portion of the removable device is located within one half of one inch of the moveable bottom portion.

13. The cash stand of claim 11 wherein the moveable base portion comprises:

a non-moveable portion; and a moveable portion.

14. The cash stand of claim 11 wherein the removable device is a scanner.

* * * * *